(12) United States Patent
Hartmann et al.

(10) Patent No.: US 12,025,562 B2
(45) Date of Patent: Jul. 2, 2024

(54) METHOD FOR OPTICAL MONITORING AND/OR DETERMINATION OF PROPERTIES OF SAMPLE

(71) Applicant: Fraunhofer-Gesellschaft zur Förderung der Angewandten Forschung E.V., Munich (DE)

(72) Inventors: Peter Hartmann, Dresden (DE); Tobias Baselt, Dresden (DE); Wulf Grählert, Dresden (DE); Oliver Throl, Dresden (DE); Philipp Wollmann, Dresden (DE)

(73) Assignee: Fraunhofer-Gesellschaft zur Förderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 17/809,620

(22) Filed: Jun. 29, 2022

(65) Prior Publication Data

US 2023/0003660 A1 Jan. 5, 2023

(30) Foreign Application Priority Data

Jun. 30, 2021 (DE) ...................... 10 2021 206 879.0

(51) Int. Cl.
*G01N 21/27* (2006.01)
*G01J 3/50* (2006.01)
(Continued)

(52) U.S. Cl.
CPC ............ *G01N 21/8422* (2013.01); *G01J 3/50* (2013.01); *G01N 21/27* (2013.01); *G01N 21/47* (2013.01);
(Continued)

(58) Field of Classification Search
CPC .... G01N 21/31; G01N 21/8422; G01N 21/27; G01N 21/47; G01N 21/55;
(Continued)

(56) References Cited

U.S. PATENT DOCUMENTS 6,061,591 A * 5/2000 Freitag ................. A61B 5/0084
607/901
6,485,414 B1 * 11/2002 Neuberger ............. A61B 1/063
600/178
(Continued)

FOREIGN PATENT DOCUMENTS

WO 2017013050 A1 1/2017

OTHER PUBLICATIONS

German and Patent Trademark Office, Office Action in Application No. DE 10 2021 206 879.0, dated Jul. 4, 2022, 7 pages. Munich, Germany.

*Primary Examiner* — Abdullahi Nur
(74) *Attorney, Agent, or Firm* — Marshall & Melhorn, LLC

(57) ABSTRACT

In the method for optical monitoring and/or determination of properties on samples, monochromatic electromagnetic radiation with a predetermined wavelength is sequentially directed from several radiation sources onto a sample influenced by an electronic evaluation unit. The respective intensity specific to the wavelength of the electromagnetic radiation scattered and/or reflected by the sample is detected by at least one detector and fed to the electronic evaluation unit for spectrally resolved evaluation in order to use it to monitor and/or determine properties of the respective sample.

11 Claims, 1 Drawing Sheet

(51) Int. Cl.
*G01N 21/47* (2006.01)
*G01N 21/84* (2006.01)

(52) U.S. Cl.
CPC .............. *G01N 2021/8427* (2013.01); *G01N 2201/0846* (2013.01)

(58) Field of Classification Search
CPC ..... G01N 2021/4742; G01N 2021/555; G01N 2021/8427; G01N 2021/0631; G01N 2021/0846; G01N 2021/129; G01J 3/0205; G01J 3/0281; G01J 3/10; G01J 3/50; G01J 3/104
See application file for complete search history.

(56) References Cited

U.S. PATENT DOCUMENTS

| | | | |
|---|---|---|---|
| 8,406,859 B2 | 3/2013 | Zuzak et al. | |
| 9,078,619 B2* | 7/2015 | Panasyuk | A61B 5/416 |
| 9,907,471 B2* | 3/2018 | Caves | A61B 5/0071 |
| 10,175,110 B2* | 1/2019 | Kim | H01L 31/147 |
| 11,029,150 B2* | 6/2021 | Sasamoto | G06V 20/588 |
| 2003/0058440 A1* | 3/2003 | Scott | G01N 21/6428 |
| | | | 356/417 |
| 2012/0056991 A1* | 3/2012 | Zund | H04N 25/702 |
| | | | 348/46 |
| 2019/0098228 A1* | 3/2019 | Wathington | H04N 23/531 |
| 2021/0186316 A1* | 6/2021 | Thommen | A61B 17/00234 |

* cited by examiner

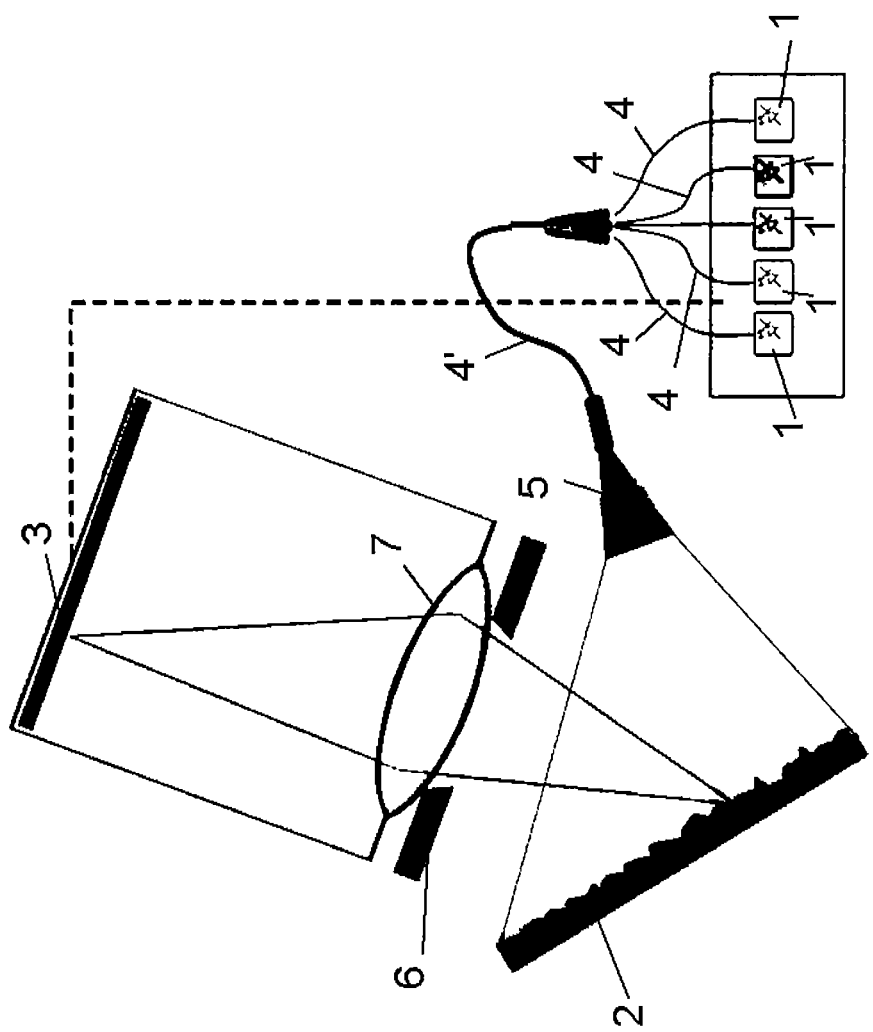

METHOD FOR OPTICAL MONITORING AND/OR DETERMINATION OF PROPERTIES OF SAMPLE

FIELD

The invention relates to a method for optical monitoring and/or determination of properties of samples. Various surface properties of samples, the properties of coatings formed on a surface of a sample, quality parameters of samples or sample assignments/sample classes can be monitored or determined.

BACKGROUND

The invention can be used in quality and process control of industrial products made from or with any of the following materials. These can be glasses, plastics, wood, ceramic, semi-conductive and metallic materials. Surfaces, coatings and paints, structured surfaces or structured components/products, large surfaces (up to several meters) with relevant features in the mm-μm range, foils or even complex technical components can be inspected. It is also used in a purity/cleanliness testing.

Applications include automotive engineering, aircraft construction, apparatus and equipment engineering, the semiconductor industry, the coating industry, art analysis, security technology, banknote testing, skin screening and the manufacture of optical glass.

So far, hyperspectral imaging has been realized on the basis of broadband illumination followed by spectral decomposition of electromagnetic radiation after the interaction of the light with a sample. A spectroscope, interferometer, or filter matrix (e.g., Fabry-Perot filter) is required to decompose electromagnetic radiation. In addition, depending on the type of spectroscope, additional equipment with a motion axis is necessary. The required technical arrangements and equipment are integrated in the cameras, thus leading to additional hardware and calibration efforts, reducing the spectral image quality (dispersion-related frequency-dependent focal planes, light throughput, signal-to-noise ratio) and/or slowing down the spectral image acquisition.

For example, the so-called pushbroom method is known, which is usually used for hyperspectral data acquisition. The light emitted from a broadband source and interacting with the sample is detected with high spectral resolution, the light of one line being spectrally split by the spectroscope and imaged onto a 2D detector. Only one line of the examined object can be mapped. A hyper-spectral image can only be acquired by a relative movement of camera and examined object.

The so-called 'snapshot' method is usually used for multispectral data acquisition. Detection of light emitted from a broadband source and interacting with the sample is performed with low spectral resolution on a 2D area detector. The latter has sub-structures (sub-pixels) that allow for spectral discrimination. The sub-structures are realized e.g. by imprinted Fabry-Perot filters and are difficult to fabricate, to calibrate and the detectors are limited in spectral and spatial resolution (usually 4×4 or 5×5 wavelengths); furthermore there are significant manufacturing variations of individual filters.

The so-called 'time-domain' method can be used for high spectral resolution. The image data is acquired with high spectral resolution. A single wavelength is separated from the received electromagnetic radiation and the image at that single wavelength is imaged onto a 2D detector. The disadvantage of this is the high amount of time required for data acquisition. Moving scenes cannot be captured in this way.

The so-called 'mapping' method can be used for highest spectral resolution. The image data is acquired point-by-point via a spectroscope or spectrometer. This method requires the highest amount of time and moving scenes cannot be taken into consideration.

SUMMARY

It is therefore the object of the invention to provide means by which samples can be monitored and/or properties from samples can be determined in a short time, without directly influencing a sample, with little effort and in a flexible manner, in particular with regard to the type of samples or their properties.

In accordance with the invention, this object is achieved by a method having the features of the claims. Advantageous embodiments and further developments of the invention can be realized with features designated in dependent claims.

In the method, monochromatic electromagnetic radiation with a predetermined wavelength $\lambda_i$ is sequentially directed onto a sample from several radiation sources under the influence of an electronic evaluation unit. The intensity of the electromagnetic radiation scattered and/or reflected by the sample, which is specific for the wavelength $\lambda_i$, is detected by at least one detector and fed to the electronic evaluation unit for a spectrally resolved evaluation in order to monitor and/or determine the properties of the respective sample.

In other words, monochromatic radiation is emitted sequentially within a time interval from a radiation source so that this monochromatic electromagnetic radiation with wavelength $\lambda_i$ impinges on a sample. The intensity of the electromagnetic radiation scattered or reflected by the sample is detected synchronously and within the same time interval by the at least one detector and fed to an electronic evaluation and control unit, in which detected intensity measurement values are stored and spectrally evaluated with other measurement values. This process is repeated in subsequent time intervals, with a different radiation source being used in each time interval, with which monochromatic radiation with a different wavelength $\lambda_{i+x}$ is emitted and, for this purpose, the respective intensity of the radiation emitted in the corresponding time interval is detected synchronously in time with the at least one detector and then fed to the evaluation and control unit. The evaluation and control unit can also be used to control the individual radiation sources.

When activating the individual radiation sources and the corresponding detection, only the knowledge of the wavelength $\lambda_i$ used in the corresponding time interval is required in order to be able to assign the correspondingly detected intensity measurement values to the respective wavelength $\lambda_i$.

Electromagnetic radiation with wavelengths $\lambda_i$ in a wavelength range 250 nm to 2500 nm, in particular 250 nm to 1100 nm or 1000 nm to 2500 nm, can be used. At least three, preferably at least ten different wavelengths $\lambda_i$ can be emitted with corresponding radiation sources.

The electromagnetic radiation emitted by the radiation sources can be guided towards the sample via optical fibers. In this case, the monochromatic electromagnetic radiation emitted by the individual radiation sources can first be directed toward the sample via one optical fiber in each case, which then opens into a single optical fiber with a coupling element. In the single optical fiber, the transmission of electromagnetic radiation with different wavelengths $\lambda_i$ occurs sequentially one after another.

The electromagnetic radiation emitted sequentially by the radiation sources can be directed toward the sample by an element homogenizing the electromagnetic radiation.

Radiation sources and/or an electromagnetic radiation homogenizing element can be used, which are equipped with thermal monitoring and a device designed for thermal management.

Electromagnetic radiation may be emitted from a plurality of radiation sources and detected by a plurality of detectors, and the radiation sources and/or detectors may be arranged in a row or row and column configuration.

Monochromatic electromagnetic radiation with a halfwidth of ≤50 nm should be emitted from the individual radiation sources.

The sample and detector(s) can preferably be moved relative to each other during emission and detection. This allows for larger areas or multiple areas of a sample that are different and spaced apart to be taken into consideration.

The method makes the use of a spectroscope, interferometer, filter matrix and (optionally) additional motion units for (hyper-)spectral imaging obsolete. The ability to spectrally decompose electromagnetic radiation is decoupled from its detection. This results in the realization of a two-dimensional spatially and spectrally resolved image acquisition. In addition, the arrangement and method open up the possibility of lateral high-resolution and simultaneously spectral-resolution image acquisition with an arbitrarily large field of view (FOV). In addition, it is possible to always set the correct focus level depending on the frequency.

The spectral decomposition of the emitted electromagnetic radiation is not performed according to the interaction of the electromagnetic radiation with the sample by interferometer or spectroscope. It can be realized by time-multiplexed multispectral illumination.

On the basis of several radiation sources, each of which emits approximately monochromatic electromagnetic radiation with a wavelength within a predetermined wavelength range with high frequency and intensity, the respective sample is sequentially irradiated with electromagnetic radiation of only a single wavelength, and by means of a detector (monochromatic, operating in the desired spectral range) the intensity of the respective electromagnetic radiation reflected or scattered by the sample can be detected. The modulation frequency with which the individual wavelengths are emitted sequentially in the direction of the sample and the detection frequency of the at least one detector are matched by a control system so that the individual intensities detected by the detector can be assigned to the respective wavelength of emitted electromagnetic radiation.

Ideally, several hundred hertz can be achieved for the modulation of the emission and detection of the image data, so that the emitted radiation can be recognized as white light by the human eye.

Furthermore, the control unit enables time multiplexing of the individual spectral emission channels and the realization of a specific spectral characteristic.

The radiation sources emitting the respective electromagnetic radiation can be coupled with optical fibers and can be adjusted with spacer boards to enable high durability and power transmission of electromagnetic radiation. In this way, as well as using thermal monitoring and thermal management of the electronic evaluation and control unit, burning of optical fibers can be suppressed. The optical fibers enable spectral illumination of the sample to be examined, e.g. via an element homogenizing the electromagnetic radiation, in particular an illumination dome, integrating sphere or funnel widening in the direction of the sample, or otherwise homogeneous, diffuse spheres.

With a direct integration of the radiation sources, which can preferably be LEDs, optionally a linear module or advantageously an array can be designed. The radiation sources can therefore be arranged in a row or a row and column arrangement. The respective monochromatic electromagnetic radiation emitted by them can be directed into an electromagnetic radiation homogenizing element (diffuse sphere, illumination dome, integrating sphere), which with thermal monitoring and thermal management influence optical fibers. However, corresponding coupling and decoupling components can be dispensed with.

If a translation or rotation unit is added to the device, a defined relative movement between detector and sample can be realized.

The spectral decomposition of the different wavelengths to be detected can be transferred from the time domain to the spatial domain. The spectral decomposition of the individual sequentially emitted monochromatic electromagnetic radiations achieved by temporal multiplexing can be projected onto the sample with lateral resolution. Using the translation/rotation speed of a motion unit, the frame rate of a camera as a detector, and the known frequency at which the individual wavelengths are successively emitted toward the sample, a spectrum can be reconstructed for individual positions on a sample.

In an electronic evaluation unit, the intensity measurement values of the detector can be acquired and processed as spectral video data in such a way that a modulation pass of the radiation sources over all channels for individual emitted wavelengths corresponds to a (multi- or hyper-) spectral image or, when using a relative movement of sample and detector, to a (multi- or hyper-) spectral image line.

To reduce the amount of data to be considered, the collected intensity measurement values, a principal component analysis or other unsupervised-learning method can compress the spectrally assigned intensity readings so that only the spectral intensity readings that explain a major portion of the variance are stored. Similarly, the spectrally assigned intensity measurement values or individual spectral channels can be reduced using conventional video compression methods. The processing of the raw data can also be done in FPGAs.

The spectrally acquired intensity measurement values or individual spectral channels can be reduced using conventional video compression methods, such as MPEG, HV1, VP9/10, HP.264 and .H.265.

The structural decoupling of the spectral decomposition from the detection of the electromagnetic radiation enables a compact scalable device for large-area and simultaneously lateral high-resolution hyperspectral imaging. Monochrome cameras with corresponding lenses can be arranged as a line or array as a detector in such a way that they can completely cover the sample area to be examined. The arrangement of the detector(s) and the measurement processing matched to it enables the simultaneous recording of the total width of the respective sample in the lateral resolution determined by the selected detectors (detector resolution, lens focal length) and with the corresponding distance between the sample and the detector. The functionality of hyperspectral imaging can be realized by the approach described above.

The invention allows for the use of standard machine vision cameras, camera selection according to standard machine vision criteria (resolution), in principle, any camera can obtain a HSI functionality as applicable to the invention. High-resolution areal and fast HSI images are possible even with relative movements of sample(s) and detector(s). Compared to other snapshot methods, angle-independent measurements can be performed. A cost reduction is possible, since, among other things, no expensive spectrometer/interferometer/filter technology is required, which must be integrated into the camera with high precision, adjusted and calibrated. The invention can also provide a concept that can be miniaturized. Simple HSI upgrades of existing cameras/vision solutions can be used. Higher quality HSI raw data can be provided, since the focal plane can be decisively set for each emitted wavelength. Application-specific spectrally precisely selected intensities can be specified. Due to a high light throughput (and thus high S/N), no intensity attenuating element is required for spectral dispersion. A spectral characteristic can be selected that is adaptable to the inspection task at hand, which is achieved by selecting the emitting radiation sources, in particular LEDs, in terms of their number and emitted wavelengths. It is possible to control the intensity distribution of the measured values to be acquired. By modulating or rapidly changing the characteristics, if necessary (e.g., if it is known that several different objects under examination are regularly alternating), an intrinsic combination of machine imaging and imaging spectroscopy, complex quality assessments and determination of complex quality characteristics, especially if shape/position/uniformity in the surface must be included, a low space requirement for process constraints, a surface can be examined without contact and without contamination. A fast, complete and automatable quality control and inline monitoring directly at or in manufacturing is possible as well as a wide scalable device by row or array arrangement of switchable LEDs as well as cameras as detectors can be implemented.

DESCRIPTION OF THE FIGURES

The invention is to be explained in more detail below by way of example.

In the drawings:

FIG. 1 shows a schematic diagram of a measurement setup that can be used to carry out the method according to the invention.

DETAILED DESCRIPTION

In this example, five monochromatic electromagnetic radiation emitting radiation sources 1 in the form of high-power LEDs are present, which are sequentially activated by an electronic evaluation and control unit not shown, so that in a time interval only monochromatic electromagnetic radiation of a wavelength λ is emitted and directed towards a sample 2 via an optical fiber 4 opening into a single optical fiber 4' by an element 5 homogenizing the electromagnetic radiation.

Electromagnetic radiation scattered or reflected by the sample 2 is incident on a projection lens 7 through an aperture 6, and an image of scattered or reflected electromagnetic radiation whose intensity is detected by the detector 3 is formed.

The recorded intensity measurement values at a specific wavelength $\lambda_i$, which are measured within the individual time intervals in which monochromatic electromagnetic radiation of a respective wavelength $\lambda_i$ are assigned to the respective wavelength $\lambda_i$ are fed to the electronic evaluation and control unit and can be taken into account there for a spectral analysis for monitoring and/or for determining properties of the respective sample 2.

What is claimed is:

1. A method for optical monitoring and/or determination of properties of samples, comprising:
   monochromatic electromagnetic radiation with a predetermined wavelength from several radiation sources is sequentially directed onto a sample under the influence of an electronic evaluation unit, and
   the respective intensity specific to the wavelength of the electromagnetic radiation scattered and/or reflected by the sample is detected by at least one detector and fed to the electronic evaluation unit for spectrally resolved evaluation in order to use it to monitor and/or determine properties of the respective sample,
   wherein the electromagnetic radiation emitted by the radiation sources is guided towards the sample via optical fibers connected to a single optical fiber in which the transmission of the electromagnetic radiation with different wavelengths occurs sequentially.

2. The method according to claim 1, wherein the electromagnetic radiation with wavelengths in a wavelength range 250 nm to 2500 nm are used.

3. The method according to claim 1, wherein the electromagnetic radiation with wavelengths in a wavelength range 1000 nm to 2500 nm are used.

4. The method according to claim 1, wherein the electromagnetic radiation emitted by the radiation sources is directed towards the sample by an element homogenizing the electromagnetic radiation.

5. The method according to claim 1, wherein the radiation sources and/or an electromagnetic radiation homogenizing element is/are used, which is/are equipped with thermal monitoring and a device designed for thermal management.

6. The method according to claim 1, wherein the electromagnetic radiation is emitted from a plurality of radiation sources and detected by a plurality of detectors, wherein the radiation sources and/or detectors are arranged in a row or row and column arrangement.

7. The method according to claim 1, wherein monochromatic electromagnetic radiation with a half width of ≤50 nm is emitted by the radiation sources.

8. The method according to claim 1, wherein the sample and the detector(s) are moved relative to each other during emission and detection.

9. The method according to claim 1, wherein in order to reduce the amount of data, a principal component analysis or other unsupervised-learning method compresses the spectral detected intensity measurement values such that only the spectral intensity values corresponding to a principal part of the variance are stored.

10. The method according to claim 1, wherein the spectrally acquired intensity measurement values or individual spectral channels are reduced by video compression methods.

11. The method according to claim 1, wherein processing of the raw data can be performed in FPGAs.

* * * * *